Figure 1:
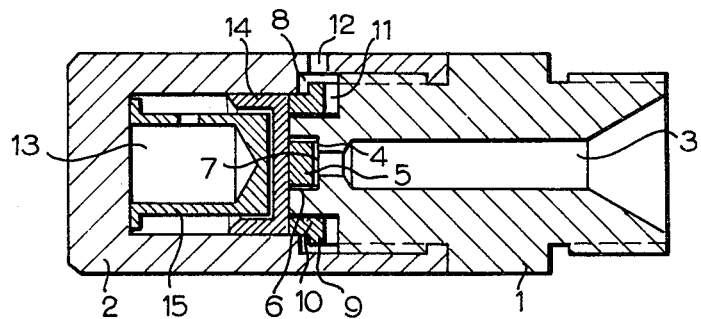

Feb. 2, 1965    F. H. CREUELS    3,168,107
RESILIENT CHECK VALVE
Filed Oct. 7, 1960    2 Sheets-Sheet 1

Inventor
Frans H. Creuels
By Cushman, Darby & Cushman
Attorneys

Feb. 2, 1965  F. H. CREUELS  3,168,107
RESILIENT CHECK VALVE
Filed Oct. 7, 1960  2 Sheets-Sheet 2

Inventor
Frans H. Creuels
By Cushman, Darby & Cushman
attorneys

United States Patent Office 3,168,107
Patented Feb. 2, 1965

3,168,107
RESILIENT CHECK VALVE
Frans H. Creuels, Hoensbroek, Netherlands, assignor to Stamicarbon N.V., Heerlen, Netherlands
Filed Oct. 7, 1960, Ser. No. 61,271
Claims priority, application Netherlands, Oct. 9, 1959, 244,203
4 Claims. (Cl. 137—525)

The present invention relates to valves.

In a known valve a sleeve of elastic material is stretched around a pin having an axial bore and outlet openings connecting with said bore. A valve of this kind is not suited for use at high pressures, and its sealing action is soon impaired if the valve has to function frequently.

The present invention provides a valve which is suitable for use at high pressures and the sealing action of which is not seriously affected by frequent operation.

According to the invention there is provided a valve comprising inlet and outlet passages respectively leading to and from spaced ports in a sealing face or faces, an elastic sealing element and a space containing or adapted to contain a control fluid under pressure to exert a closing force on said elastic sealing element and press it into sealing contact with said sealing face or faces to close off said ports.

The pressure at which the valve operates depends on the sealing area of the said face and equals the pressure of the control fluid in said space. The pressure at which the valve opens or closes can be accurately adjusted by controlling the pressure of the control fluid.

Since the valve operates with little or no friction and the resistance to deformation of the sealing element is negligible, the pressure at which the valve opens is practically equal to that at which it closes. When the elastic element is slightly lifted by the pressure of the medium in the device to be controlled, a small quantity of medium seeps from the inlet port(s) between the elastic element and the sealing face to the outlet port(s). This causes little wear. If, however, the outlet port(s) should wear slightly, e.g., due to the medium in the device being controlled containing an abrasive material, the action of the valve will not be adversely affected since sealing is effected on the face between the inlet and outlet ports. Should there be a likelihood of solid particles from the medium under control being left on the sealing face, the sealing element may be made sufficiently elastic to yield around these particles so that the sealing action will not be adversely affected thereby.

If the transverse dimensions of the inlet and outlet ports are small as compared with the thickness of the elastic sealing element, this element will not be damaged by being forced into the openings even if it is made of very elastic material, e.g., rubber, and even though subjected to high pressures. The openings in the sealing face are preferably slot-shaped, since slots have a large passage area in proportion to their width. A narrow slot can be formed in a simple manner by providing a recess or groove in the sealing face and mounting a disc or ring therein leaving a small clearance therearound. Alternatively a disc or ring made of a porous material could be mounted in the said recess or groove, the pores in this material then serving as passage openings.

The elastic sealing element may comprise a diaphragm although in this case the control fluid will have to be introduced into the said space by way of a valve or pressure control means provided for this purpose. The elastic sealing element preferably comprises a cup-shaped element and the said space preferably comprises a cylindrical chamber in which the said element is slidably mounted. Control fluid can now be introduced into the said chamber by placing the valve in a space containing fluid under the desired pressure. The fluid flows between the peripheral wall of the cup-shaped element and the inner wall of the chamber until the said desired pressure prevails in the chamber. When the valve is removed from the pressure space, the control fluid will be retained in the chamber by the expansion of the peripheral wall of the sealing element against the inner wall of the chamber and the sealing element will be pressed against the sealing face with a force equally distributed over its whole sealing area. If desired, the cylindrical wall of the chamber may before filling be smeared with a glue that hardens after filling so that the sealing element is hermetically attached to the wall of the chamber.

Compressed air or another compressed gas, or a liquid, may be used as the control fluid.

A valve according to the invention is particularly suitable for use as a relief valve in hydraulic devices, such as hydraulic pit props, etc. If the pressure of the control fluid in said chamber is controllable, the valve may be used as a regulating or switch valve in a hydraulic or pneumatic circuit. Furthermore a valve according to the invention may be used as a measuring valve by connecting the said chamber with a space in which the pressure is to be measured, and measuring the pressure needed to force a gas or liquid through the valve.

Figure 2:
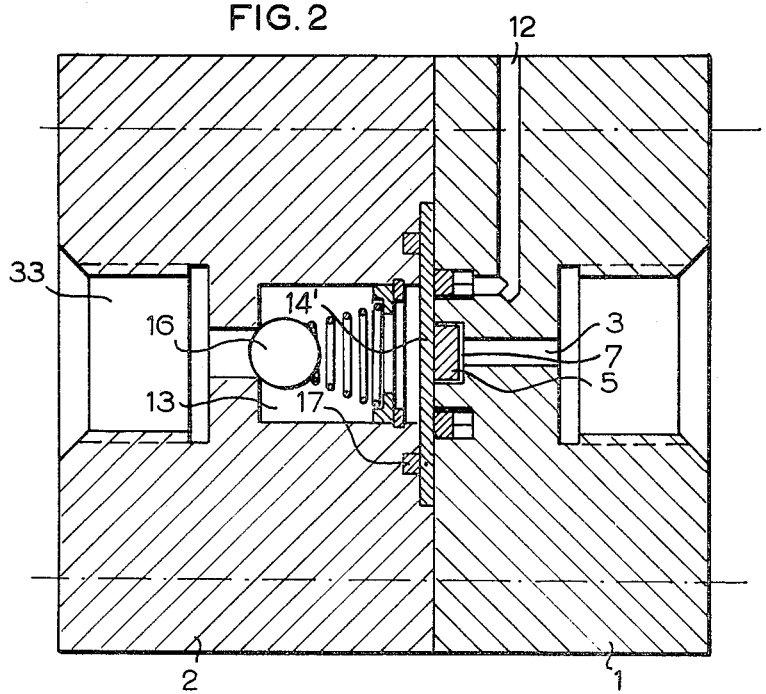
Figure 3:
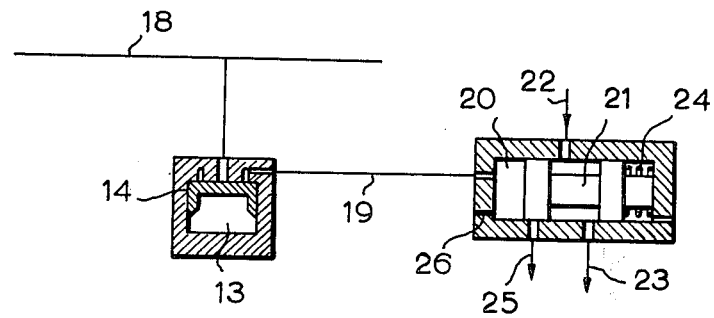
Figure 4:
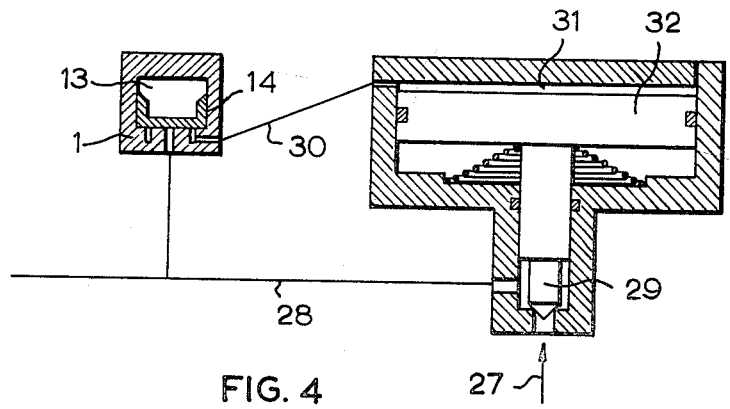

The invention will be further described with reference to a number of embodiments shown in the accompanying drawing, in which:

FIG. 1 is a cross-section of a safety valve having a cup-shaped sealing element, FIG. 2 shows a safety valve having a diaphragm as its sealing element, FIG. 3 shows a control valve and FIG. 4 a reducing valve.

Referring to FIG. 1, the valve comprises a valve housing 1 and a hood 2. The housing is provided with a central inlet passage 3, one end of which communicates with the device to be safeguarded, the other end opening into a recess 4 in the sealing face of the valve housing. In this recess a disc 5 is mounted with a small lateral clearance, e.g., of 0.1 mm. therearound, so that there is a narrow annular slot 6 around the disc forming the inlet port. Grooves 7 are provided in the lower face of the disc 5 so that liquid can flow from the space to be safeguarded through the bore 3 and along the grooves 7 to the slot 6. The top of the disc is flush with the sealing face or projects slightly from it.

Between the upper part of the housing and the inner wall of the hood there is an annular groove 8, in which a ring 9 is mounted with a small clearance, so that a slot-like annular outlet port 10, e.g., having a width of 0.1 mm. is formed. The outlet port 10 communicates with the surroundings through passages 11 in the ring and a bore 12 in the hood.

A chamber 13 is provided in the hood 2 in which is slidably mounted a cup-shaped elastic sealing element 14, which rests with its flat sealing face against the sealing face of the housing and is made, e.g., of rubber having a thickness of some mm., eg., 3 mm.

Before use, the valve is placed in a space containing a fluid under the pressure at which it is desired that the valve should operate, e.g., compressed air having a pressure of 300 kg./cm.$^2$. This fluid flows into the chamber 13 through the bore 12 and the slot 10 and between the peripheral wall of the sealing element 14 and the inner wall of the chamber 13 until the desired pressure prevails also in the chamber 13. The valve is then ready for use. A box 15 placed in the chamber 13 prevents the sealing element 14 from being pressed into the chamber during filling, the box being a sufficiently loose fit as to enable the sealing element to be lifted during operation.

If during operating the pressure of the medium in the device connected with the valve exceeds the pressure in the chamber 13, the sealing element will be lifted slightly and the medium will flow from the slot 6 along the sealing face to the slot 10, from where it can be further discharged. Depending on whether the medium discharged is to be re-used or not, the discharged medium may be either collected or allowed to go to waste. When the pressure in the device to be safeguarded has fallen to below the pressure of the control fluid in chamber 13 due to the discharge of medium therefrom, the sealing element will again be pressed into contact with the sealing face to close the valve.

In the embodiment shown in FIG. 2, in which like parts have been given like reference numerals, a diaphragm 14' is used as the sealing element and the control fluid is introduced into the chamber 13 through a back-pressure valve 16. The chamber 13 is sealed where it joins the diaphragm by means of a sealing ring 17.

In the embodiment shown in FIG. 3 a valve according to the invention serves as a control valve in a hydraulic or pneumatic control system. When the pressure in the line 18 rises above the pressure prevailing in the chamber 13, the sealing element 14 is lifted and medium flows from the line 18 to the line 19 and so to the housing 20 of a valve piston 21, causing the piston 21 to move to the right in the aspect of FIG. 3, so that the line 22 is connected with the line 23. When the pressure in the line 18 falls to below that in the chamber 13, the valve will close and no more medium will be fed to the housing 20 so that the spring 24 will move the piston 21 to the left and the line 22 will be connected with the line 25, the medium in the housing 20 escaping through a narrow opening 26.

FIG. 4 shows the application of a valve according to the invention in a reducing device. The line 27 contains a medium under a high pressure for feeding a line 28 in which the pressure has to be kept at a substantially constant value lower than the pressure in line 28. Line 28 is connected with the regulating valve 1, the control fluid in the pressure chamber 13 of which is at the same pressure as the desired reduced pressure in the line 28.

If the pressure in the line 28 is lower than the reduced pressure desired, a valve 29 is lifted by the pressure in the line 27, so that medium can flow from the high-pressure line to the line 28 and so raises the pressure in this line. When the pressure in the line 28 exceeds the desired reduced pressure, the sealing element 14 is lifted and medium flows through a line 30 to a chamber 31 over a piston 32 connected with the valve 29, so closing the valve 29 and preventing the pressure in the line 28 from rising further.

The pressure of the medium in the chamber 13 may, if desired, be adjustable. For example, in the embodiment shown in FIG. 2 the chamber 13 may be connected via the bore 33 with a pressure regulator (not shown), the non-return valve 16 being omitted. With a valve of this kind it is possible to determine the pressure prevailing in a space by connecting said space with the chamber 13 and measuring the pressure needed to force a medium through the valve.

A hydraulic pit prop provided with a relief valve according to the invention and in which the hydraulic fluid was water containing 2000 mg./l of solid particles did not show any reduction of the working pressure or any signs of leakage after a few months operation.

The total telescoping of the prop during this period amounted to 25 m and the initial pressure was 300 kg./cm.$^2$. Comparable results cannot be obtained with conventional relief valves.

What is claimed is:

1. A valve apparatus for sealing fluids under high pressure and automatically maintaining constant pressure at the inlet end thereof responsive to the pressure of a control fluid comprising: housing means having fluid chamber means for receiving a control fluid under pressure, said housing means including inlet and outlet fluid passage means adapted for communication with one another via said fluid chamber means over a sealing surface adjacent said inlet and outlet fluid passage means, an elastic sealing element positioned adjacent said sealing surface, said elastic sealing element having a sealing face for sealing engagement with said sealing surface, the sealing face of said elastic sealing element being longitudinally movable toward and away from sealing engagement with said sealing surface, said control fluid in said fluid chamber means providing a closing force on said elastic sealing element on a surface thereof opposite to said sealing face to thereby automatically bias the sealing face of said elastic sealing element against said sealing surface and maintain constant pressure at the inlet end of said valve apparatus by permitting a fluid under pressure to lift said sealing face of said elastic sealing element from said sealing surface when the pressure of fluid at the inlet end of said valve exceeds the pressure of the control fluid in said fluid chamber means, thereby permitting the fluid at the inlet end of said valve to flow from said inlet fluid passage means across said sealing surface to said outlet fluid passage means until the pressure at the inlet end of said valve equals the pressure of the control fluid in said fluid chamber means.

2. The valve apparatus of claim 1 wherein said sealing surface is substantially flat.

3. The valve apparatus of claim 1 wherein said elastic sealing element is a cup-shaped member positioned with its base adjacent said sealing surface.

4. The valve apparatus of claim 3 including a retaining member carried in said housing means and within said cup-shaped sealing element, said retaining member having a closed end adjacent the base of said cup-shaped sealing element and an interior chamber defining at least part of said fluid chamber means.

References Cited in the file of this patent

UNITED STATES PATENTS

| | | |
|---|---|---|
| 2,715,418 | Van Derbeck | Aug. 16, 1955 |
| 2,747,608 | Grove | Mar. 29, 1956 |
| 2,877,791 | Rich | Mar. 17, 1959 |
| 2,908,290 | Hamilton-Peters | Oct. 13, 1959 |
| 2,949,930 | Moore | Aug. 23, 1960 |
| 3,010,477 | Graham | Nov. 28, 1961 |